United States Patent
Kim et al.

(10) Patent No.: US 7,813,282 B2
(45) Date of Patent: Oct. 12, 2010

(54) CONNECTION ADMISSION CONTROL METHOD AND APPARATUS IN BROADBAND WIRELESS ACCESS SYSTEM

(75) Inventors: Ki-Baek Kim, Seongnam-si (KR); Eun-Chan Park, Seongnam-si (KR); Dong-Soo Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 313 days.

(21) Appl. No.: 11/866,235

(22) Filed: Oct. 2, 2007

(65) Prior Publication Data

US 2008/0080378 A1 Apr. 3, 2008

(30) Foreign Application Priority Data

Oct. 2, 2006 (KR) .................... 10-2006-0097123

(51) Int. Cl.
H04J 3/16 (2006.01)
(52) U.S. Cl. ..................................................... 370/234
(58) Field of Classification Search ................. 370/316, 370/234; 375/260
See application file for complete search history.

(56) References Cited

U.S. PATENT DOCUMENTS

| | | | |
|---|---|---|---|
| 7,085,247 B2 * | 8/2006 | Schweinhart et al. | 370/316 |
| 2007/0248178 A1 * | 10/2007 | Zhu et al. | 375/260 |

FOREIGN PATENT DOCUMENTS

| | | |
|---|---|---|
| CN | 1802000 | 7/2006 |
| JP | 2005-117579 | 4/2005 |
| JP | 2006-526346 | 11/2006 |
| JP | 2007-509527 | 4/2007 |
| KR | 1020030049531 | 6/2003 |
| KR | 1020030086752 | 11/2003 |
| KR | 1020040036100 | 4/2004 |
| KR | 1020040069001 | 8/2004 |
| KR | 1020050037073 | 4/2005 |

* cited by examiner

*Primary Examiner*—Derrick W Ferris
*Assistant Examiner*—Gbemileke Onamuti
(74) *Attorney, Agent, or Firm*—The Farrell Law Firm, LLP (57) ABSTRACT

Provided are a Connection Admission Control (CAC) method and apparatus in a Broadband Wireless Access (BWA) system. The CAC method includes checking a class of a requested service; converting the transmission request rate of the service into the number of required air resource blocks by using an average block capacity of the checked class; and determining whether to admit or deny connection by comparing the number of required resource blocks with the number of available resource blocks.

33 Claims, 9 Drawing Sheets

CONNECTION ADMISSION CONTROL METHOD AND APPARATUS IN BROADBAND WIRELESS ACCESS SYSTEM

PRIORITY

This application claims priority under 35 U.S.C. §119 to an application filed in the Korean Intellectual Property Office on Oct. 2, 2006 and assigned Serial No. 2006-97123, the contents of which are herein incorporated by reference.

BACKGROUND OF THE INVENTION

1. Field of the Invention

The present invention relates to a Connection Admission Control (CAC) method and apparatus in a Broadband Wireless Access (BWA) system, and in particular, to a CAC method and apparatus in a BWA system whereby whether to admit or deny connection is determined by converting a transmission request rate into the number of required slots to be compared with the number of available slots.

2. Description of the Related Art

In a wireless access system, when limited network resources are distributed to a plurality of Mobile Stations (MSs), the number of access connections (or the amount of traffic) must be restricted to ensure Quality of Service (QoS). To this end, Connection Admission Control (CAC) is used to determine whether to admit or deny connection in response to an access request (hereinafter, a 'connection admission request') in consideration of currently available resources.

Figure 1:
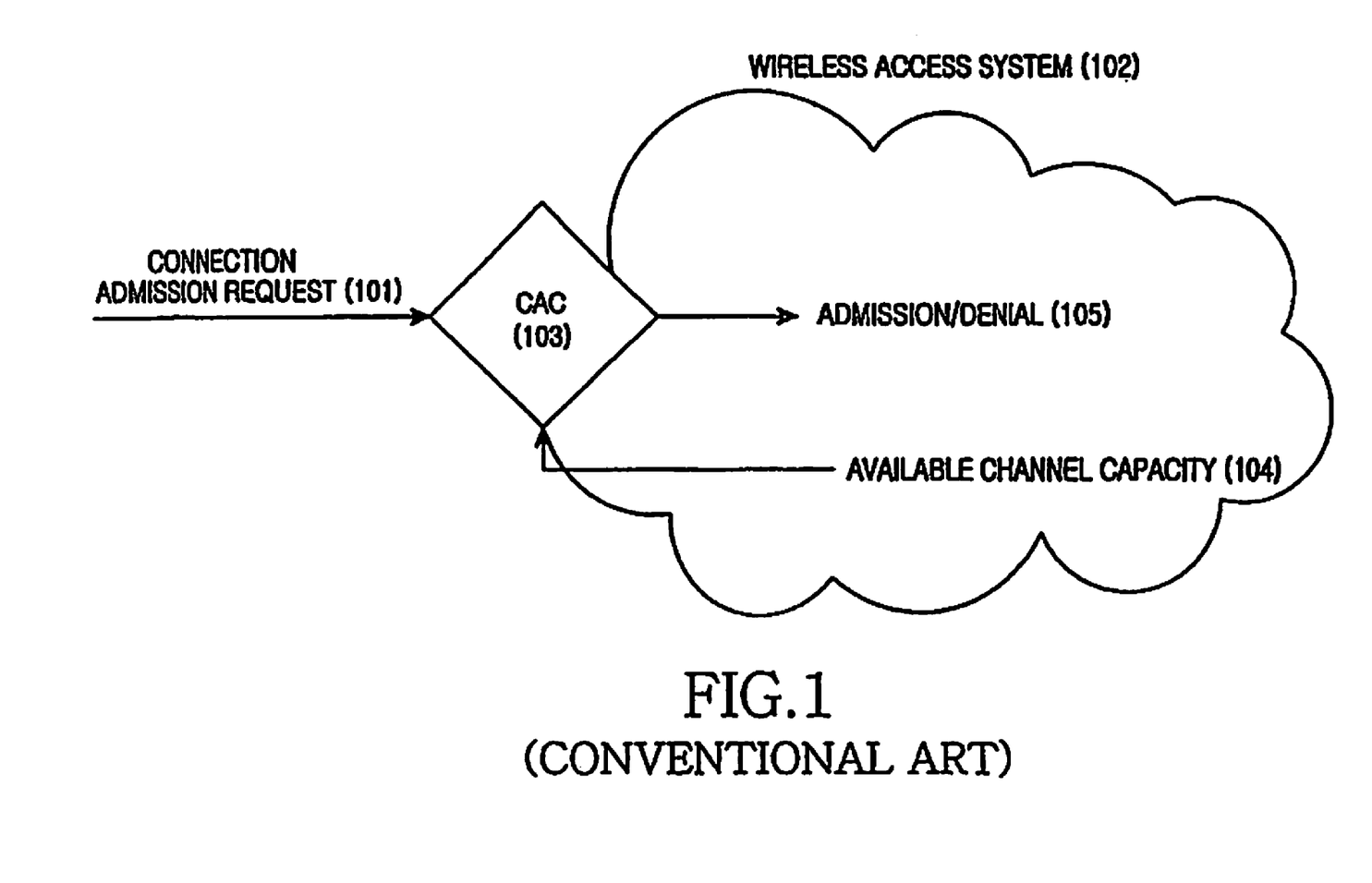
FIG. 1 is a view for explaining a general concept of Connection Admission Control (CAC)

FIG. 1 is a view for explaining a general concept of CAC.

According to a general CAC algorithm, when a connection admission request 101 is received from an MS for a specific service, a wireless access system 102 examines an available channel capacity 104 (having the same unit as a bandwidth or a transmission rate). Then, a CAC process 103 is performed in such a manner that the available channel capacity 104 is compared with a transmission request rate of a connection that requests connection admission and if the transmission request rate is less than the available channel capacity, the connection is allowed, otherwise, it is denied.

A Broadband Wireless Access (BWA) system (also referred to as a mobile World interoperability for Microwave Access (WiMAX) system) based on the Institute of Electrical and Electronics Engineers (IEEE) 802.16e Wireless Metropolitan Area Network (WMAN) employs a next generation wireless communication technique. With this technique, not only voice service but also various multimedia services (e.g., Internet access, high-speed data transmission, video, etc.) can be provided at any time or location through use of a portable terminal. In addition, a data service can be provided at a higher transmission rate than the transmission rate of the conventional cellular mobile network.

In the BWA system, the available channel capacity continuously changes for the following reasons: multi-path fading and shadowing, a time-varying channel condition of a portable terminal, and a movement speed. Furthermore, signaling overhead (e.g., MAP information) varies depending on the number of users accessing the BWA system; and the available channel capacity is enhanced using Adaptive Modulation and Coding (AMC), Hybrid Automatic Repeat reQuest (HARQ), Proportional Fairness (PF) scheduling, or Automatic Repeat reQuest (ARQ).

Therefore, estimating the available channel capacity is one of the most important factors in determining the admittance of a connection request.

However, the CAC algorithm used in the conventional Code Division Multiple Access (CDMA) network or the conventional Global System for Mobile communication (GSM) network is not easily applied to the BWA system because the BWA system employs an Orthogonal Frequency Division Multiple Access (OFDMA) scheme, and thus its multi-channel operation method is different from that of the conventional wireless network.

In the BWA system, a Real Time (RT) service connection must be differentiated from a Non Real Time (NRT) service connection. Further, a new connection must be dealt with in a different way from a handover connection.

In the BWA system, a MAP records the information on resource allocation in a two-dimensional domain composed of a time domain and a frequency domain. Along with an increase in the number of users, MAP overhead increases. This feature must be taken into account in designing the CAC of the BWA system.

Accordingly, there is a demand for a CAC method and apparatus in a BWA system, whereby an RT service connection is differentiated from an NRT service connection, a new connection is differentiated from a handover connection, and MAP overhead must be taken into account

SUMMARY OF THE INVENTION

The present invention provides a Connection Admission Control (CAC) method and apparatus in a Broadband Wireless Access (BWA) system whereby CAC is performed in a different manner according to a service class.

The present invention also provides a CAC method and apparatus in a BWA system whereby whether to admit or deny a connection is determined by differentiating a Real Time (RT) service connection from a Non Real Time (NRT) service connection.

The present invention also provides a CAC method and apparatus in a BWA system whereby whether to admit or deny a connection is determined by differentiating a new connection from a handover connection.

The present invention also provides a method and apparatus for performing CAC by considering MAP overhead.

The present invention also provides a method and apparatus for performing CAC by converting a transmission request rate of a Mobile Station (MS) into the number of required slots and by comparing the number of required slots with the number of available slots.

According to an aspect of the present invention, a method of performing a CAC process in a BWA system is provided. The method includes checking a class of the requested service; converting a transmission request rate of the service into the number of required air resource blocks by using an average block capacity of the checked class; and determining whether to admit or deny the connection by comparing the number of required air resource blocks with a number of available blocks.

According to another aspect of the present invention, a method of performing a CAC process in a BWA system is provided. The method includes classifying different services into two or more service classes according to whether advanced technologies are applied; checking the class of the requested service; estimating the size of an available resource block corresponding to the checked service class; estimating the size of the required resource block; and determining whether to admit or deny connection by comparing the size of the required resource block with the size of the available resource block.

According to another aspect of the present invention, a Base Station (BS) apparatus of a wireless communication system is provided. The apparatus includes a controller for checking whether connection establishment is requested; and a processor for, if the connection establishment is requested, checking the class of the requested service, converting the transmission request rate of the service into the number of required blocks by using the average block capacity of the checked class, and determining whether to admit or deny a connection by comparing the number of required blocks with that of available blocks.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

The present invention will now be described more fully with reference to the accompanying drawings, in which exemplary embodiments of the invention are shown. In the description of the present invention, if it is determined that a detailed description of commonly-used technologies or structures related to the invention may unintentionally obscure the subject matter of the invention, the detailed description will be omitted. Also, since later-described terms are defined in consideration of the functions of the present invention, they may vary according to users' or operators' intentions or practice. Hence, the terms must be interpreted based on the contents of the entire specification.

The present invention provides a Connection Admission Control (CAC) method and apparatus in a Broadband Wireless Access (BWA) system whereby whether to admit or deny connection is determined by converting a transmission request rate into the number of required slots to be compared with the number of available slots. The present invention also provides a method of performing a connection admission in a different manner according to a service class. Herein, the slot represents an air resource block. Basically, the air resource block is distinguished based on frequency and time (or optionally space).

Although the BWA system is described hereinafter as an example, the present invention may also apply to any other systems as long as the systems simultaneously support traffics having different characteristics.

Figure 2:
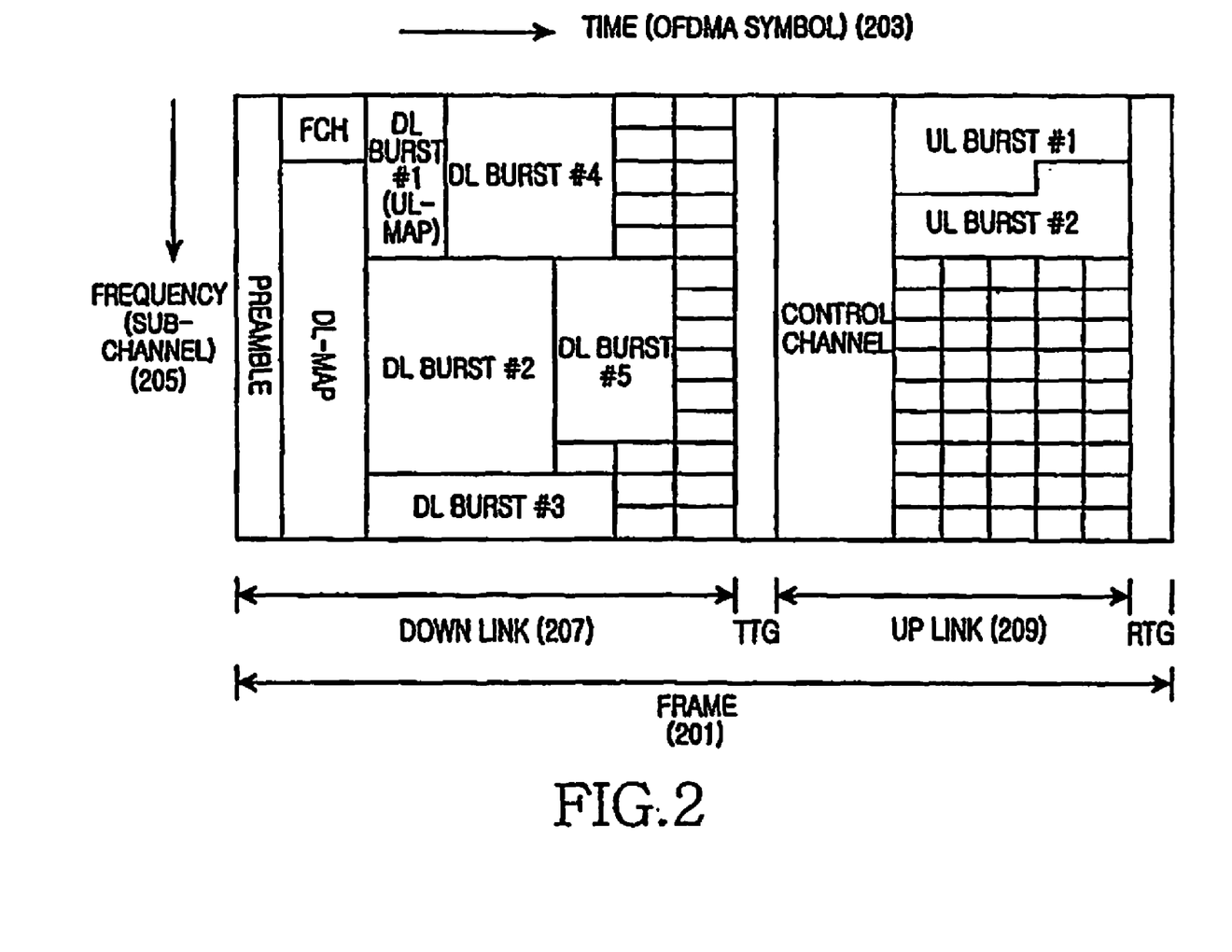
FIG. 2 illustrates a frame structure used in an Orthogonal Frequency Division Multiple Access (OFDMA)-based Broadband Wireless Access (BWA) system.

FIG. 2 illustrates a frame structure used in an Orthogonal Frequency Division Multiple Access (OFDMA) based BWA system.

An OFDMA frame 201 is represented in a two-dimensional domain composed of a time domain (OFDMA symbol) 203 and a frequency domain (sub-channel) 205. The time domain is divided into a DownLink (DL) frame 207 and an UpLink (UL) frame 209. The DL frame 207 includes a preamble, a Frame Control Header (FCH), a DL-MAP, an UL-MAP, and a plurality of DL bursts. The UL frame 209 includes a control channel and a plurality of UL data bursts. The DL preamble is used to obtain initial synchronization and to search for a cell. The FCH contains information for describing a basic structure of a frame. The DL-MAP and the UL-MAP contain information indicating a DL and UL data burst region, respectively. The control channel of the UL frame may include a ranging region, a Channel Quality Indicator Channel (CQICH) region, an Acknowledgement Channel (ACKCH) region, and a sounding region.

In this frame structure, the minimum unit of resource allocation is a slot which is differently configured according to a permutation. Configuration of a slot composed of a sub-channel and an OFDMA symbol is defined in the IEEE 802.16 standard. In addition, the number of sub-carriers constituting one slot is also defined therein. The total number of slots constituting one frame is determined by using these definitions. A Burst is a group of slots having the same Modulation and Coding Scheme (MCS) level.

Figure 3:
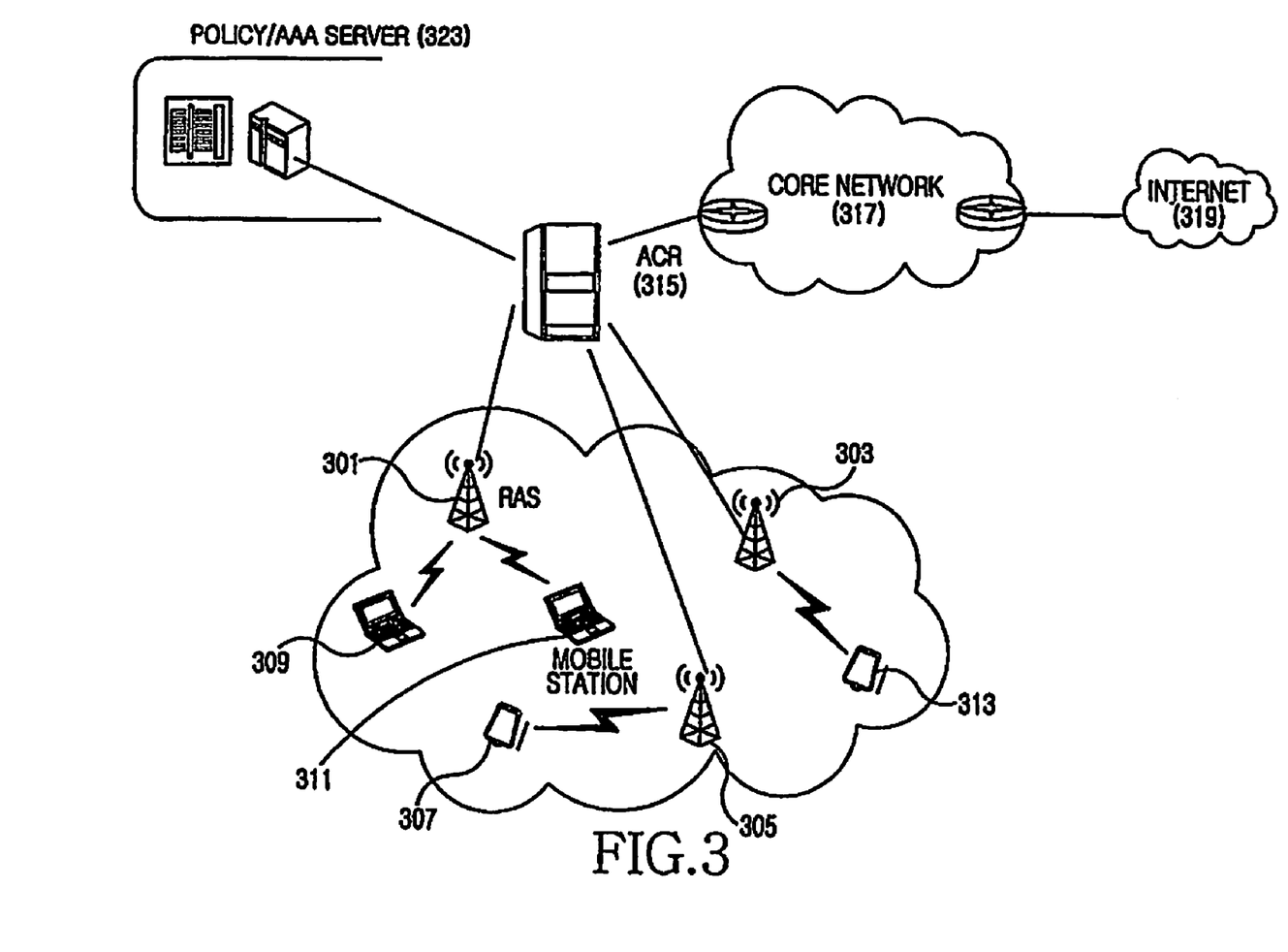
FIG. 3 illustrates a network configuration according to the present invention.

FIG. 3 illustrates a network configuration according to the present invention.

Referring to FIG. 3, the network configuration is constructed of Mobile Stations (MSs) 307, 309, 311, and 313, Radio Access Stations (RASs) 301, 303, and 304, an Access Control Router (ACR) 315, and a Policy/Authentication, Authorization, Accounting (AAA) server 323. The Radio Access Stations may be Base Stations (BSs). The ACR is also referred to as an Access Service Network-Gateway (ASN-GW). A network constructed of at least one RAS and an ACR is defined as an Access Service Network (ASN). As shown in the figure, a Policy Decision Function (PDF) and an AAA function may be implemented in a single server or may be separately implemented in two different servers. A Network Entity (NE) is a term defined according to a function, and may differ from one user (or operator) to another.

Referring to FIG. 3, the policy/AAA server 323 authenticates an MS and performs a payment process in cooperation with the ASN. When the authentication of the MS is successful, the policy/AAA server 323 determines a policy to be applied to the MS and transmits the determination result to the ASN. Then, the ASN controls a Service Flow (SF) of the MS according to the determined policy.

The ACR 315 transmits traffic received from a Core Network (CN) 317 to a corresponding RAS 301 or 303 or 305, and transmits traffic received from the RAS 301 or 303 or 305 to the CN 317. The ACR 315 manages the SF, the connection, and the mobility of each MS. A SF with a unique identifier is generated for each DL and UL connection.

The RASs 301, 303, and 305 transmit traffic received from the ACR 315 to the corresponding MS, and transmits traffic received from the MS to the ACR 315. The following description will focus on communication between the RAS 301 and the MS 309. The RAS 301 is connected to the ACR 315 via a wired link, and is logically connected to the MS 309 via a wireless link. The RAS 301 performs scheduling according to the QoS parameters of service flow defined in the Media Access Control (MAC) layer, and allocates resources to the MS 309. Upon receiving a connection establishment request from the MS 309, the RAS 301 performs CAC by converting a transmission request rate of the corresponding connection into the number of required slots, and then by comparing the number of required slots with the number of available slots. In this case, the RAS 301 may perform CAC according to the service type (or service class). Detailed embodiments will be described below with reference to Equations.

First, the number of slots currently occupied to serve SFs is estimated for each service class. The number of used slots is indirectly estimated to avoid computational complexity.

Specifically, for each service class, the distribution of MCS level is estimated. The distribution is used to obtain an average channel capacity.

A unit slot capacity, defined as the achievable amount of bandwidth with a single slot, may differ depending on the service class. Since the scheduling algorithm applied to the SF is different from each other service class, the applicability of Hybrid Automatic Repeat reQuest (HARQ) and Automatic Repeat reQuest (ARQ) depends on the service class. Therefore, the unit slot capacity is different from each other service class and should be obtained for each service class. According to the present invention, five services are classified into three classes according to whether HARQ, ARQ, and PF scheduling can be applied. The five service classes defined in IEEE 802.16e are an Unsolicited Grant Service (UGS), an Extended Real-Time Variable Rate (ERT-VR) service, a Real-Time Variable Rate (RT-VR) service, a Non-Real-Time Variable Rate (NRT-VR) service, and a Best Effort (BE) service. The five service classes may be defined otherwise according to which system the service classes are applied. Access techniques (e.g., HARQ, ARQ, Interference Cancellation (IC), Multiple Input Multiple Output (MIMO), BeamForming (BF), and PF scheduling) will be herein referred to as advanced technologies. Applicability of the advanced technologies depends on a QoS request of traffic, and an amount of available air resources varies according to the applicability of the advanced technologies. Thus, such factors must be taken into account when CAC is performed.

Services to which all of the advanced technologies are not applied (e.g., UGS ERT-VR, and RT-VR) are defined as a Real Time (RT) class. Services to which HARQ and PF scheduling are applied (e.g., NRT-VR) are defined as a Non Real Time (NRT) class. Services to which HARQ, ARQ, and PF are all applied are defined as a BE class. Such classification is only an example, and thus a classification may be performed in various ways according to a system policy. For example, UGS and ERT-VR may be classified into one class, and RT-VR and NRT-VR may be classified into two different classes. According to which advanced technology is applied, different service type connections may be classified into one class.

It will be assumed hereinafter that UGS, ERT-VR, and RT-VR are classified into one service class (i.e., an RT service), and NRT-VR is classified into another service class (i.e., an NRT service).

A total of M MCS levels are present according to an Adaptive Modulation and Coding (AMC) method, and a physical layer transmission rate of an i-th MCS level will be defined as $r_i$, where $1 \leq i \leq M$.

For every predetermined time period T, MCS distribution is estimated for each service class. A total number of slots used to transmit data bursts during the time period T for a specific service class will be defined as $N_s$, and the number of slots transmitted for the i-th MCS level will be defined as $n_i$.

Then, MCS distribution probability can be expressed by Equation (1) below.

$$p_i = Pr[MCS = i] = \frac{n_i}{N_s} \quad (1)$$

By using the MCS distribution, an average slot capacity ($\Delta r$,) can be expressed by Equation (2) below.

$$\Delta r = \frac{\bar{r}}{N_s} = \frac{1}{N_s}\left(\sum_{i=1}^{M} p_i r_i\right) \quad (2)$$

The average slot capacity obtained using Equation (2) may differ depending on a service class, and thus the average slot capacity should be computed for each service class.

Thereafter, by using the average slot capacity and a transmission rate of a corresponding connection, the number of slots currently being used is estimated for the RT class and the NRT class by using Equation (3) below.

$$S_{RT}^{used} = \sum_{j=1}^{N_{RT}} \frac{r_{RT}^j}{\Delta r_{RT}},$$

$$S_{RT}^{used} = \sum_{k=1}^{N_{NRT}} \frac{r_{NRT}^k}{\Delta r_{NRT}} \quad (3)$$

In Equation (3) above, $N_{RT}$ and $N_{NRT}$ denote the number of connections belonging to the RT class and the NRT class, respectively, of a service to which connection has already been admitted according to the CAC process. $r_{RT}^j$ and $r_{NRT}^j$ denote transmission rates of the RT connection and the NRT connection, respectively.

Such estimation is repeated every time period T. As expressed by Equation (4) below, an average value may be computed using an Exponentially Weighted Moving Average (EWMA) to reduce burst characteristics.

$$\bar{S}_{RT}^{used} = w S_{RT}^{used} + (1-w)\bar{S}_{RT}^{used} \quad (4)$$

In Equation (4) above, the EWMA of the number of used slots for the RT class has a parameter w ($0 \leq w \leq 1$). The same will also be applied to the NRT class.

When a connection establishment is requested, a transmission request rate of the requested service is converted into the number of slots required for the service by using the average slot capacity. The transmission request rate is compared with an available resource that has been converted into the number of available slots, and then whether to admit or deny the connection is determined.

The total number of slots for each frame is constant irrespective of traffic type, applicability of HARQ, and scheduling algorithm. However, even when a permutation method is predetermined, the total number of available slots varies depending on the number of users because MAP overhead and signaling overhead increase along with the increase in the number of users, and thus a data region (the number of OFDMA symbols) that can transmit data in a DL frame is reduced. Typical examples of the signaling overhead include a Downlink Channel Descriptor (DCD), an Uplink Channel Descriptor (UCD), a Traffic Indication (TRF-IND), a Paging ADVertisement (PAG-ADV), and a Neighbor ADVertisement (NBR-AVD). In addition, a message related to a process of generating, deleting, and modifying a call and a message related to bandwidth (BW) allocation and polling are also in association with the signaling overhead wherein the both messages probabilistically increase in proportion to the number of users. Among broadcasting messages, a TRF-IND message and a PAG-ADV message also increase the overhead along with the increase in the number of users. In consideration of such conditions, the total number of slots of one frame is defined as S, excluding the MAP overhead and the signaling overhead. The MAP overhead may be an average value obtained in the time period T.

Whether to admit or deny a connection for the RT class and the NRT class is determined as follows. When a SF belonging to the RT class requests a new connection admission, the connection is admitted if Equation (5) below is satisfied.

$$\frac{r_{RT}^{in}}{\Delta r_{RT}} < \alpha S - (S_{RT}^{used} + S_{NRT}^{used}) \quad (5)$$

The number of required slots is obtained using an average slot capacity ($\Delta r_{RT}$) and a transmission request rate ($r_{RT}^{in}$) of an RT connection. When the number of required slots is less than the number of available slots, the connection is admitted. In Equation (5) above, $\alpha$ is a constant value ranging from 0 to 1. The total number of available slots decreases along with the decrease in the constant value $\alpha$, which leads to a reduction of the number of admissible connections.

Likewise, if a SF belonging to the NRT class requests a connection establishment, it is admitted when Equation (6) is satisfied.

$$\frac{r_{NRT}^{in}}{\Delta r_{NRT}} < \beta S - (S_{RT}^{used} + S_{NRT}^{used}) \quad (6)$$

In Equation (6), a constant $\beta$ is used as a parameter so that an RT connection has a higher priority than an NRT connection. $\beta$ is set to be less than $\alpha$, and thus some slots whose amount is $(\alpha-\beta)*S$ are dedicated for the RT connection, i.e., the RT connection can use slots up to $\alpha*S$, while the NRT connection can use slots up to $\beta*S$.

Similar to Equations (5) and (6) above, a decision rule for handover connection can be expressed by Equations (7) and (8) below.

Transmission request rates of a handover RT connection and a handover NRT connection are defined as $r^{ho}_{RT}$ and $r^{ho}_{NRT}$, respectively.

$$\frac{r_{RT}^{ho}}{\Delta r_{RT}} < (\alpha + \delta)S - (S_{RT}^{used} + S_{NRT}^{used}) \quad (7)$$

$$\frac{r_{NRT}^{ho}}{\Delta r_{NRT}} < (\beta + \delta)S - (S_{RT}^{used} + S_{NRT}^{used}) \quad (8)$$

In Equations (7) and (8) above, $\delta(0<\delta<1)$ and $(\alpha+\delta)<1$ must be satisfied, so that a handover connection has higher priority than a new connection.

As shown in Equations (5) to (8), whether to admit or deny connection is determined for the RT connection and the NRT connection. Here, the capacity currently being used by a BE connection is not taken into account because the RT connection and the NRT connection have higher priorities than the BE connection.

Whether to admit or deny the RT connection or the NRT connection is determined according to the estimated number of available slots without consideration of the BE connection. Thus, once an RT or NRT connection is admitted, the resources used to serve the BE connection may be partially or entirely allocated to the newly admitted RT or NRT connection.

Therefore, in order to avoid a starvation of BE traffic, it is preferable that $\delta$, $\beta$, and $\delta$ are properly determined through experimentation.

Figure 4:
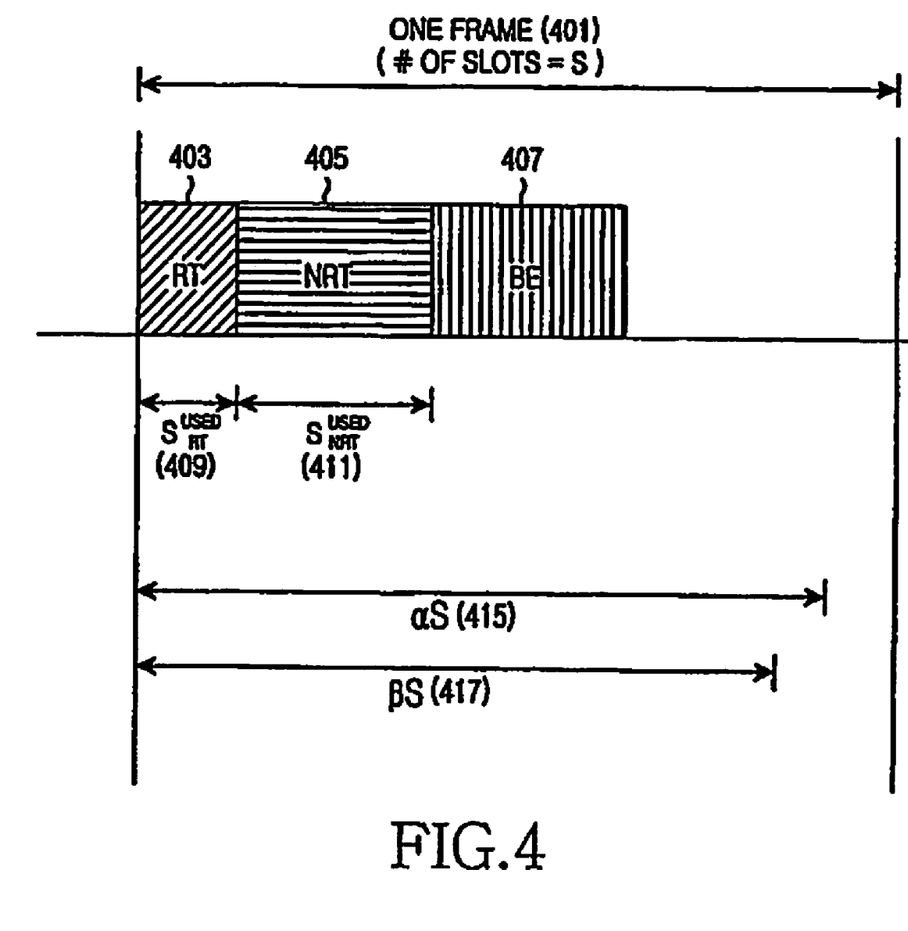
FIG. 4 is a view explaining a CAC algorithm according to the present invention.

FIG. 4 is a view for explaining a CAC algorithm according to the present invention.

Referring to FIG. 4, one frame 401 is composed of S slots. Since MAP overhead is excluded in the present invention, the number of slots S does not include the MAP overhead. In the frame 401 having the S slots, the number of used slots in an RT connection period 403, in which connection has already been admitted and thus a service is provided, is $S_{RT}^{used}$ 409. Further, the number of slots for an NRT connection period 405 is $S_{NRT}^{used}$ 411. The rest of slots are available slots. Such available slots may be allocated to RT and NRT connections that require access. That is, slots currently being used in a BE connection 407 may be used for RT and NRT connections since RT and NRT connections have higher priority over the BE connection.

In the same manner as differentiating RT and NRT connections according to priority, a new connection and a handover connection can be differentiated.

Figure 5:
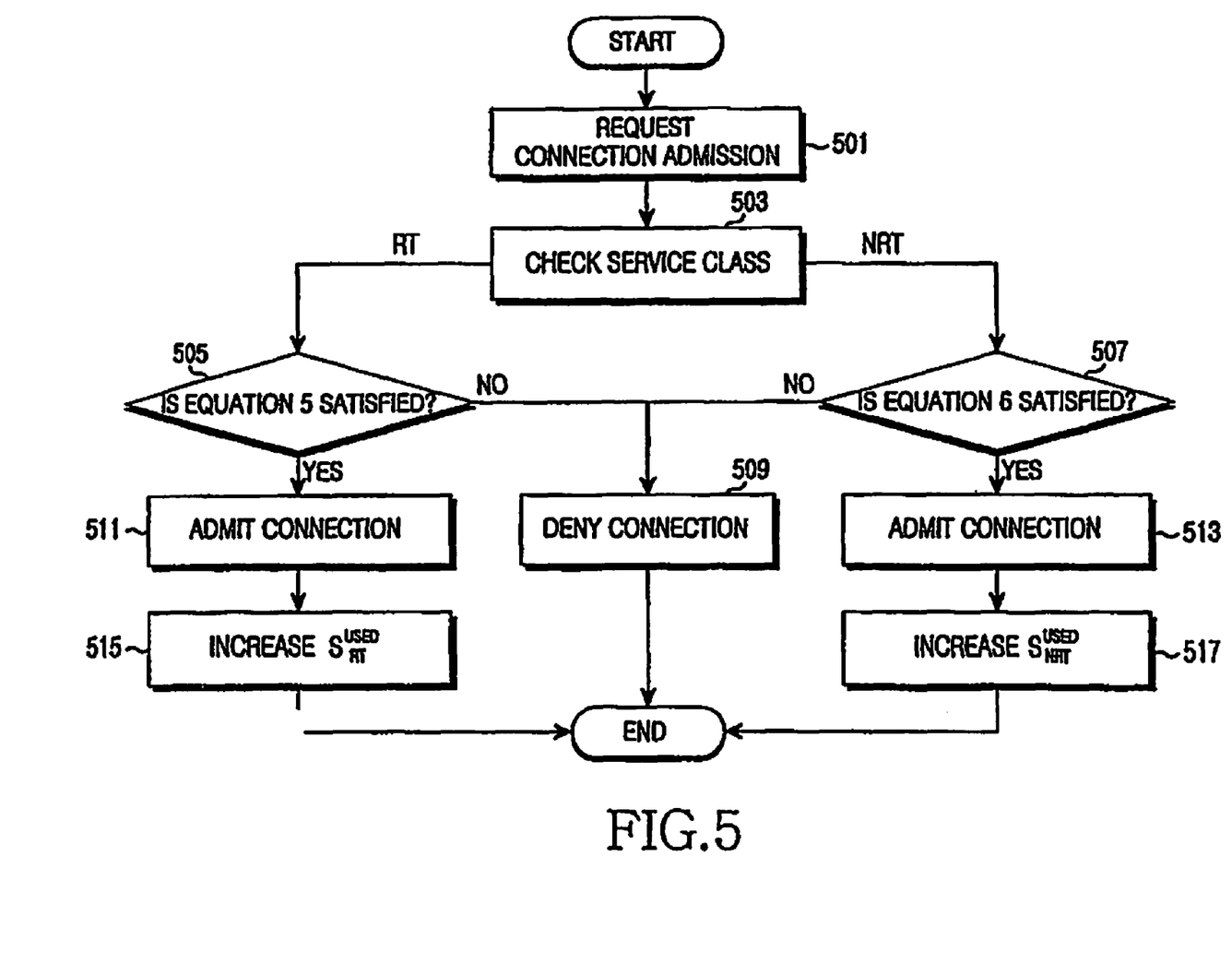
FIG. 5 is a flowchart illustrating a process performed by a Base Station (BS) to handle a connection establishment request according to the present invention.

FIG. 5 is a flowchart illustrating a process performed by a BS to handle a connection establishment request according to the present invention. The flowchart shows a connection admission algorithm for determining whether to admit or deny connection when a MS requests a new connection establishment.

Referring to FIG. 5, a connection admission request (or a connection establishment request) is received from the MS, in step 501. Upon receiving the connection admission request, a class of the requested service is checked, in step 503. Whether to admit or deny connection is determined according to a service class. That is, if the class of the requested service is RT, the number of required slots is determined using a transmission request rate and an average slot capacity of the RT service, and the number of required slots is compared with the number available slots, in step 505. That is, whether to satisfy Equation (5) above is determined. If Equation (5) above is satisfied, service connection is admitted, in step 511. Then, the number of used slots for the RT service ($S_{RT}^{used}$) is increased (i.e., the number of used slots is increased, and thus the number of available slots decreases), in step 515. If Equation (5) above is not satisfied, the requested service connection is denied (step 509).

However, if the class of the requested service is NRT, the number of required slots is determined using a transmission request rate and an average slot capacity of the NRT service, and the number of required slots is compared with the number available slots in step 507. That is, whether to satisfy Equation (6) above is determined. If Equation (6) above is satisfied, service connection is admitted in step 513. Then, the number of used slots for the NRT service ($S_{NRT}^{used}$) is increased (that is, the number of used slots is increased, and thus the number of available slots decreases) in step 517. If Equation (6) above is not satisfied, the requested service connection is denied in step 509. Then, the procedure is ended.

Although the case that the class of the requested service is BE is not described herein, if a BE class service requests connection admission, connection is admitted within a currently available slot. However, if the admission for an RT or NRT class is requested, some parts of slots used for the BE class may be used to serve the RT or NRT class.

Figure 6:
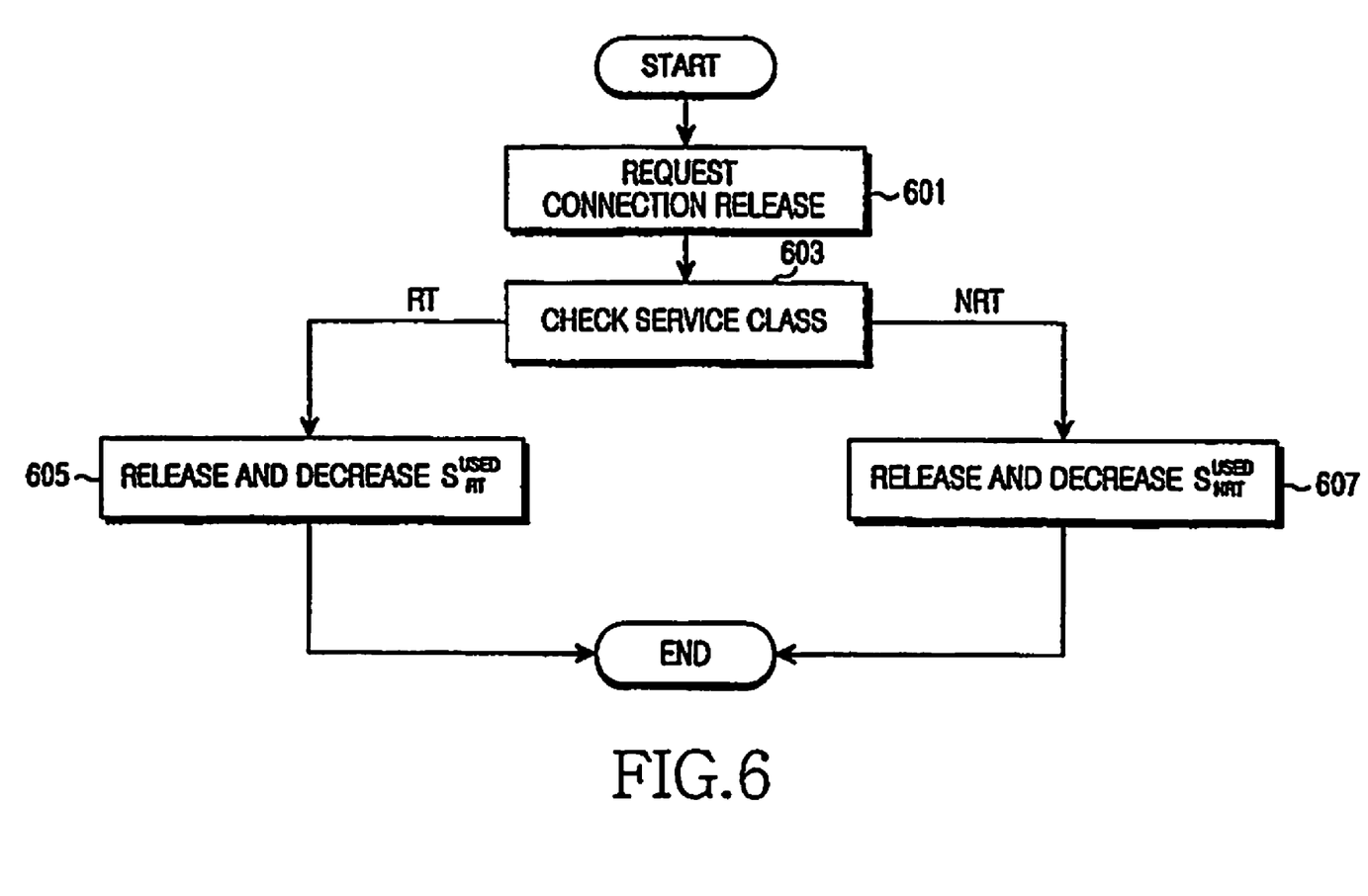
FIG. 6 is a flowchart illustrating a process performed by a BS to handle a connection release request according to the present invention.

FIG. 6 is a flowchart illustrating a process performed by a BS to handle a connection release request according to the present invention. The flowchart shows how to handle a request of releasing the connection.

Referring to FIG. 6, a connection release request is received from an MS, in step 601. Upon receiving the connection release request, the corresponding class of the requested service is checked, in step 603.

If the service class is RT, the release-requested connection is released, and the number of used slots for the RT service ($S_{RT}^{used}$) is decreased, in step 605. As a result, the number of available slots increases. If the service class is NRT, the release-requested connection is released, and the number of used slots for the NRT service ($S_{NRT}^{used}$) is decreased in step 607. As a result, the number of available slots increases.

In the aforementioned embodiment explained with reference to FIGS. 4 to 6, services (i.e., UGS, ERT-VR, RT-VR, and NRT-VR) excluding BE are classified into two services, and CAC is performed for each service class. However, in another embodiment, the four services may be classified into four different classes, and CAC may be performed for each class. In the following description, it will be assumed that the four services are classified into four classes, and CAC is performed for each service class.

Figure 7:
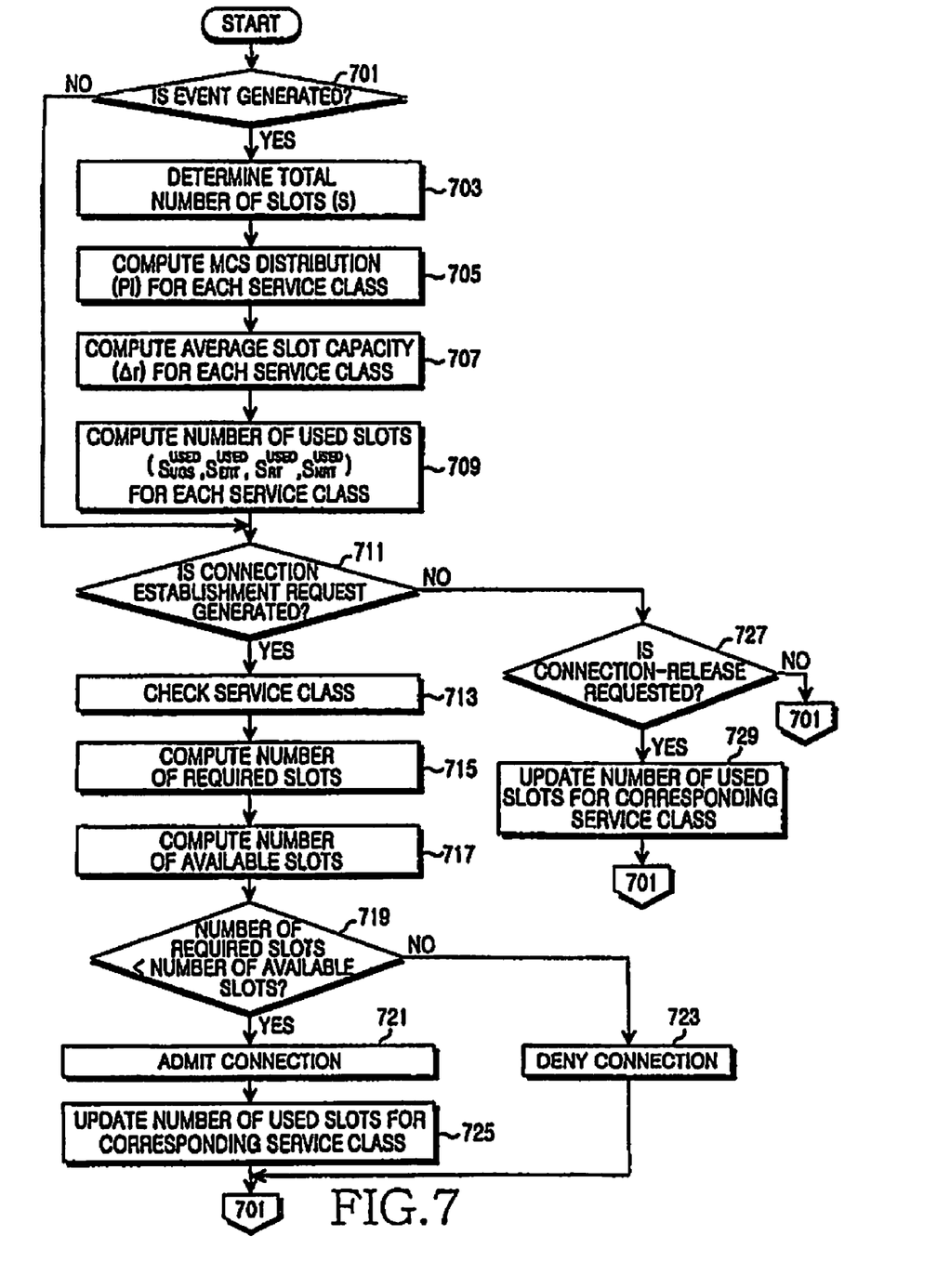
FIG. 7 is a flowchart illustrating a CAC process performed by a BS according to the present invention.

FIG. 7 is a flowchart illustrating a CAC process performed by a BS according to the present invention.

Referring to FIG. 7, in step 701, whether a specific event is generated is checked. The event may be periodically generated or may be generated when a specific condition is satisfied. It will be assumed hereinafter that the event is periodically generated. If the event generation is not detected, the procedure goes to step 711, and thus whether a connection establishment request is generated is checked.

Upon detecting the event, in step 703, a total number of slots (S) excluding MAP overhead is determined. In step 705, for each service class excluding BE, an MCS distribution ($P_i$: distribution probability for an i-th MCS level) is computed using Equation (1) above. That is, MCS distribution is estimated for each service class (i.e., UGS, ERT-VR, RT-VR, and NRT-VR).

In step 707, an average slot capacity ($\Delta r$) is computed using Equation (2) above for each service class. In this step, the average slot capacity is computed for each of the four service classes. In step 709, the number of used slots is computed using Equation (9) below for each service class.

$$S_{UGS}^{used} = \sum_{j=1}^{N_{UGS}} \frac{r_{UGS}^j}{\Delta r_{UGS}}$$

$$S_{ERT}^{used} = \sum_{j=1}^{N_{ERT}} \frac{r_{ERT}^j}{\Delta r_{ERT}}$$

$$S_{RT}^{used} = \sum_{j=1}^{N_{RT}} \frac{r_{RT}^j}{\Delta r_{RT}}$$

(9)

-continued $$S_{NRT}^{used} = \sum_{j=1}^{N_{NRT}} \frac{r_{NRT}^j}{\Delta r_{NRT}}$$

As such, the number of used slots is computed for each service class, and thereafter, in step 711, whether there is a connection establishment request is checked. The connection establishment request may be performed at the request of the BS or the MS. Upon detecting the connection establishment request, in step 713, the class of the requested service is checked.

In step 715, the number of required slots is computed using a transmission request rate of the service and an average slot capacity of the service class. For example, when the service class is UGS, the number of required slots may be computed using Equation (10) below.

$$\text{number of required slots} = \frac{r_{UGS}^{in}}{\Delta r_{UGS}}$$ (10)

In step 717, the number of available slots is computed using the number of used slots for the respective service classes (i.e., $S_{UGS}^{used}$, $S_{ERT}^{used}$, $S_{RT}^{used}$, and $S_{NRT}^{used}$) and using the total number of slots (S). When a weighting factor $\gamma_N$ is used for a corresponding service class, the number of available slots may be computed using Equation (11) below.

number of available slots=$\gamma_N S - (S_{UGS}^{used} + S_{ERT}^{used} + S_{RT}^{used} + S_{NRT}^{used})$ (11)

In Equation (11), the weighting factor $\gamma_N$ may be equally applied to all service classes. If priorities are assigned to the respective service classes, the weight factor $\gamma_N$ may be differently applied to each service class. Preferably, the weighting factor $\gamma_N$ can be determined according to a system condition through experiment.

In step 719, the number of required slots is compared with the number of available slots. If the number of required slots is less than the number of available slots, the procedure proceeds to step 721, and thus connection is admitted. In step 725, the number of slots used for a corresponding service class is updated (increased), and the procedure returns to step 701. If the number of required slots is greater than or equal to the number of available slots, the procedure goes to step 723, and thus connection is denied. Then, the procedure returns to step 701.

If the connection establishment request is not detected in step 711, the procedure goes to step 727, and thus whether there is a connection release request is checked. The connection release request may be performed by the BS or by the MS. If the connection release request is not detected, the procedure returns to step 701, and subsequent steps are repeated. Upon detecting the connection release request, the procedure goes to step 729, and thus a corresponding connection is released, and the number of used slots for a corresponding service class is updated (decreased). Then, the procedure returns to step 701.

In the embodiment explained with reference to FIG. 7, CAC is performed for each of the four services. However, in another embodiment, the four services may be classified into three service classes, and the CAC may be performed for each of the three service classes. In this case, UGS and ERT-VR may be classified into one service class, and RT-VR and NRT-VR may be classified into two different service classes.

Figure 8:
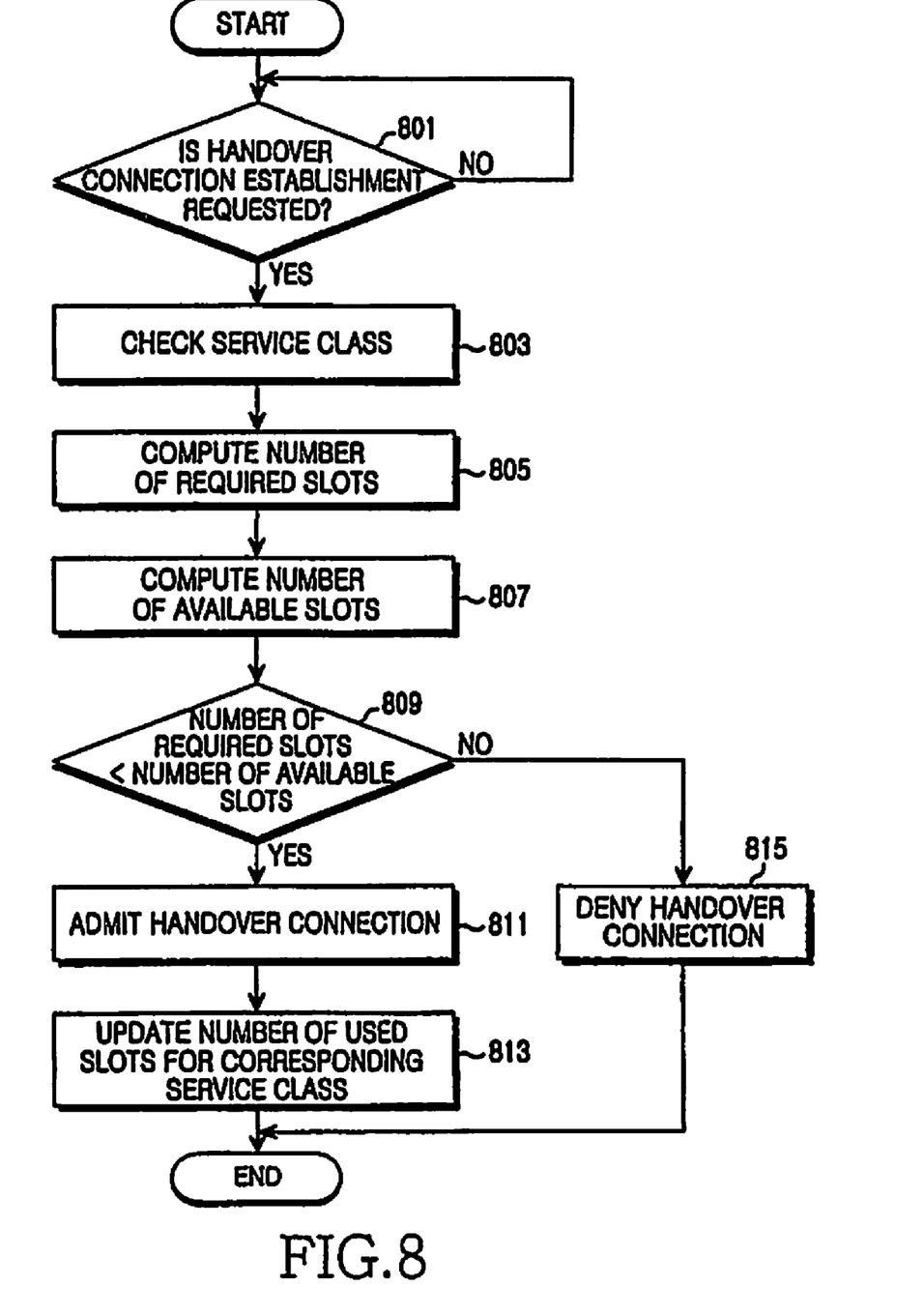
FIG. 8 is a flowchart illustrating a process performed by a BS to handle connection of a Mobile Station (MS) to be handed over, according to the present invention.

FIG. 8 is a flowchart illustrating a process performed by a BS to handle connection of an MS to be handed over, according to the present invention.

Referring to FIG. 8, in step 801, whether there is a connection establishment request of an MS which handovers to a cell of the BS from a neighboring Bs is checked. Upon detecting the connection establishment request, in step 803, a class of the requested service is checked.

After checking the service class, in step 805, the number of required slots is computed using a transmission request rate of the service and an average slot capacity of the service class. For example, when the service class is UGS, the number of required slots may be computed using Equation (12) below.

$$\text{number of required slots} = \frac{r_{UGS}^{ho}}{\Delta r_{UGS}} \qquad (12)$$

In step 807, the number of available slots is computed using the number of used slots for each service class (i.e., $S_{UGS}^{used}$, $S_{ERT}^{used}$, $S_{RT}^{used}$, and $S_{NRT}^{used}$) and the total number of slots (S). Assuming that a weighting factor $\delta_N$ is applied to the service class in a handover condition, the number of available slots may be computed using Equation (13) below.

$$\text{number of available slots} = \delta_N S - (S_{UGS}^{used} + S_{ERT}^{used} + S_{RT}^{used} + S_{NRT}^{used}) \qquad (13)$$

Herein, the weighting factor $\delta_N$ may be equally applied to all service classes. When priorities are assigned to the service classes, the weighting factor $\delta_N$ may be determined to a different value. When priority is assigned to a handover connection, the weighting factor $\delta_N$ is determined to be greater than a weighting factor $\gamma_N$.

In step 809, the number of required slots is compared with the number of available slots. If the number of required slots is less than the number of available slots, the procedure proceeds to step 811, and connection is admitted. In step 813, the number of used slots for the service class is updated (increased). If the number of required slots is greater than or equal to the number of available slots, the procedure goes to step 815, and connection is denied.

Figure 9:
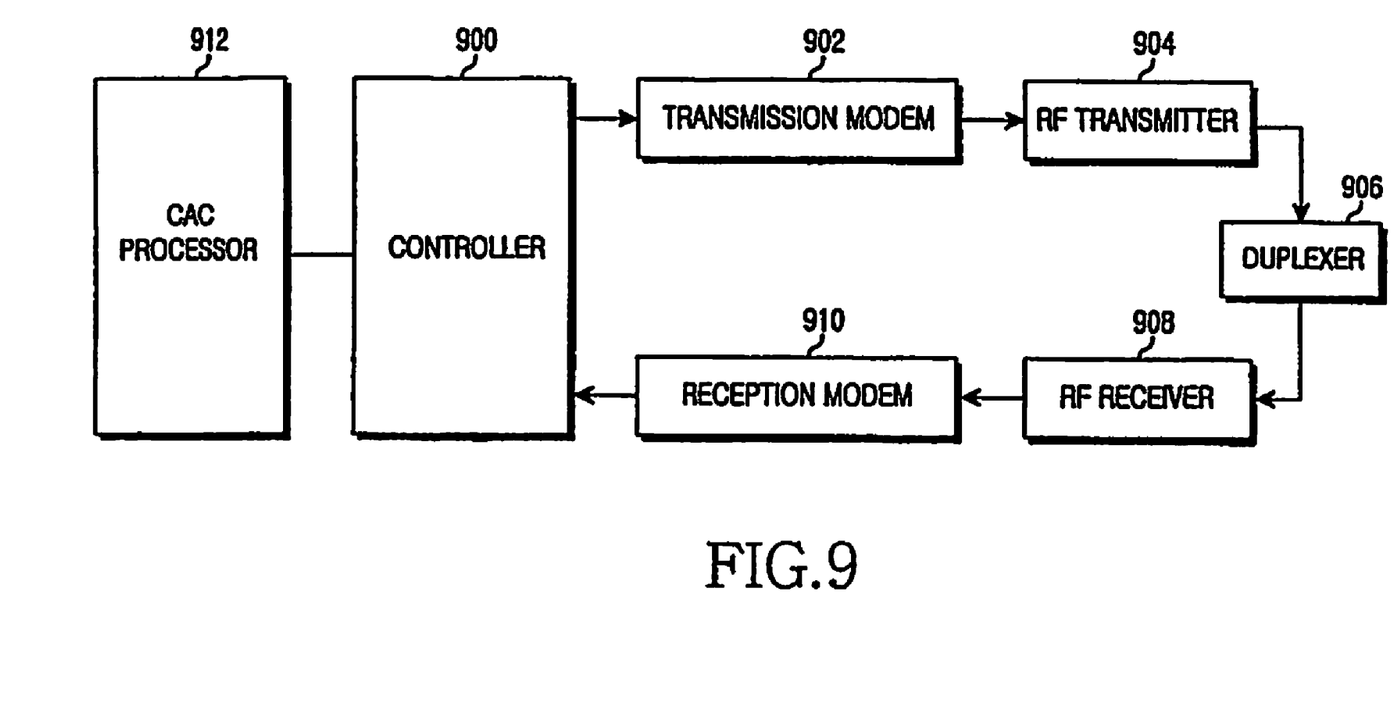
FIG. 9 is a block diagram of a BS according to the present invention.

FIG. 9 is a block diagram of a BS according to the present invention.

Referring to FIG. 9, the BS includes a controller 900, a transmission modem 902, a Radio Frequency (RF) transmitter 904, a duplexer 906, an RF receiver 908, a reception modem 910, and a CAC processor 912.

The transmission modem 902 includes a channel coding block and a modulation block, and converts a message received from the controller 900 into a baseband signal. The channel coding block may include a channel encoder, an interleaver, and a modulator. The modulation block may include an Inverse Fast Fourier Transform (IFFT) operator so that transmission data can be carried over a plurality of orthogonal sub-carriers. When using a CDMA system, the IFFT operator may be replaced with a code-spread modulator or a similar operator.

The RF transmitter 904 includes a frequency converter and an amplifier, and converts the baseband signal received from the transmission modem 902 into an RF signal. According to a duplex method, the duplexer 906 transmits the signal transmitted from the RF transmitter 904 through an antenna, and provides the signal received through the antenna to the RF receiver 908. The RF receiver 908 includes an amplifier and a frequency converter, and converts the RF signal transmitted through a wireless channel into a baseband signal.

The reception modem 910 includes a demodulation block and a channel decoding block, and demodulates the signal received from the RF receiver 908 into a baseband signal. The reception modem 910 includes an FFT operator so as to extract data carried over each sub-carrier. The channel decoding block includes a demodulator, a de-interleaver, and a channel decoder.

The controller 900 provides overall control for communication. For example, the controller 900 generates a signaling message to be transmitted to the transmission modem 902, and analyzes the signaling message received from the reception modem 910. In addition, the controller 900 generates a data burst, to be transmitted, to the transmission modem 902, and processes the data burst received from the reception modem 910 according to a predetermined protocol. Furthermore, when a connection establishment request is detected, the controller 900 reports this to the CAC processor 912.

The CAC processor 912 manages available system resources. Upon detecting the connection establishment request, the CAC processor 912 determines whether to admit or deny connection according to a currently available resource, and reports the determination result to the controller 900. According to the present invention, the CAC processor 912 converts a transmission rate required by a requested service into the number of required slots, and compares the number of required slots with the number of available slots. In this manner, connection admission is controlled. In this case, the CAC processor 912 may perform CAC with respect to services according to their service types. Alternatively, the CAC processor 912 may divide the services into a plurality of class groups, and perform CAC for each class group.

For example, a connection may be established by performing a Dynamic Service Addition (DSA) process. Upon receiving a DSA request message from the MS, the controller 900 analyzes the DSA request message and reports the analysis result to the CAC processor 912. Then, the CAC processor 912 checks a class of the requested service, and computes the number of available slots according to the checked service class. Further, the CAC processor 912 computes the number of required slots for the requested service, and compares the number of required slots with the number of available slots. Thus, whether to admit or deny the connection is determined, and the determination result is reported to the controller 900. The controller 900 generates a DSA response message according to the CAC result, and transmits the DSA response message to the MS.

According to the present invention, in a Broadband Wireless Access (BWA) system, a transmission request rate is converted into the number of required slots by using the average slot capacity, and the number of required slots is compared with the number of available slots. Thus, whether to admit or deny a connection can be determined. Advantageously, QoS of a service flow can be ensured by differentiating admission rules among different service classes with different service priorities.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of performing a Connection Admission Control (CAC) process in a Broadband Wireless Access (BWA) system, comprising the steps of:
checking, by a Base Station (BS), a class of a requested service;
converting, by the BS, a transmission request rate of the requested service into a number of required air resource blocks by using an average block capacity of the checked class and determining the number of available blocks; and
determining, by the BS, whether to admit or deny the connection by comparing the number of required air resource blocks with a number of available blocks, wherein the step of determining the number of available blocks includes computing a Modulation and Coding Scheme (MCS) distribution probability for each service class, computing an average block capacity for each service class by using the MCS distribution probability, determining the number of used air resource blocks for each service class by using the average block capacity and determining the number of available blocks by using the number of used blocks for the service class, and
wherein the number of available blocks is computed by $$\text{number of available blocks} = \gamma\, S - \sum_{m=1}^{M} S_m^{used},$$

where S denotes a total number of blocks, M denotes the number of service classes, $S_m^{used}$ denotes the number of used blocks for the m-th service class, and $\gamma$ denotes a weighting factor applied to the requested service class.

2. The method of claim 1, wherein, a distribution probability $P_i$ for an i-th MCS level for each service class is computed by $$p_i = \frac{n_i}{N_s},$$

where $N_s$ denotes a total number of used blocks in a predetermined time period for a service class and $n_i$ denotes the number of blocks to which the i-th MCS level is applied for the corresponding service class.

3. The method of claim 1, wherein an average block capacity $\Delta r$ of each service class is computed by $$\Delta r = \frac{1}{N_s}\left(\sum_{i=1}^{M} p_i r_i\right),$$

where $N_s$ denotes the total number of used blocks in a predetermined time period for a service class, $p_i$ denotes a distribution for an i-th MCS level for the corresponding service class, M is the total number of MCS levels, $r_i$ denotes the transmission rate of the i-th MCS level for the corresponding service class, $n_i$ denotes the number of blocks to which the i-th MCS level is applied for the corresponding service class, and M denotes a total number of MCS levels.

4. The method of claim 1, wherein the number of used blocks for the corresponding service class is computed by $$S^{used} = \sum_{j=1}^{N} \frac{r^j}{\Delta r},$$

where N denotes the number of connections belonging to the corresponding service class, $R^j$ denotes the transmission rate of the j-th connection of the corresponding service class, and $\Delta r$ denotes the average block capacity of the corresponding service class.

5. The method of claim 1, wherein the total number of blocks S is the number of blocks in a data region excluding a control and signaling region.

6. The method of claim 1, wherein the weighting factor $\gamma$ is equally or differently applied to all service classes.

7. The method of claim 1, wherein the number of required blocks is computed by $$\text{number of required blocks} = \frac{r^{in}}{\Delta r},$$

wherein $r^{in}$ denotes the transmission request rate of the requested service and $\Delta r$ denotes the average block capacity of the corresponding service class.

8. The method of claim 1, further comprising classifying an Unsolicited Grant Service (UGS), an Extended Real-Time Variable Rate (ERT-VR) service and a Real-Time Variable Rate (RT-VR) service into a first class, and a Non-Real-Time Variable Rate (NRT-VR) service into a second class.

9. The method of claim 1, further comprising classifying a UGS into a first class, an ERT-VR service into a second class, an RT-VR service into a third class, and an NRT-VR service into a fourth class.

10. The method of claim 1, wherein different services are classified into two or more classes according to whether advanced technologies are applied,
wherein the advanced technology is at least one scheme selected from a group of schemes consisting of Adaptive Modulation & Coding (AMC) scheme, permutation, an Automatic Repeat reOuest (ARO) scheme, a Hybrid ARO (HARO) scheme, a Proportional Fairness (PF) scheduling scheme, Multiple Input Multiple Output (MIMO), Beam Forming (BF), and Interference Cancellation (IC).

11. The method of claim 1, further comprising, if a connection is admitted or released for a service, updating the number of available blocks.

12. The method of claim 1, further comprising:
upon detecting a connection establishment request of a Mobile Station (MS) to be handed over, checking a class of a requested service;
converting the transmission request rate of the requested service into the number of required blocks, by using an average block capacity of the checked service class;
computing the number of available blocks, corresponding to the checked service class, in consideration of a handover condition; and
determining whether to admit or deny a connection by comparing the number of required blocks with the number of available blocks in the handover condition.

13. The method of claim 12, wherein when computing the number of available air resource blocks, $(\alpha+\beta)$ is substituted for $\gamma$, where $\alpha$ denotes a weighting factor in a non-handover condition of the corresponding service class, and $(\alpha+\beta)$ denotes a weighting factor in a handover condition.

14. The method of claim 1, wherein if the number of required air resource blocks is less than the number of available blocks, the connection is admitted.

15. The method of claim 1, wherein the requested service comprises one of an Unsolicited Grant Service (UGS), an Extended Real-Time Variable Rate (ERT-VR) service, a Real-Time Variable Rate (RT-VR) service, a Non-Real-Time Variable Rate (NRT-VR) service, and a Best Effort (BE) service.

16. The method of claim 1, wherein the connection is established by performing a Dynamic Service Addition (DSA) process.

17. A Base Station (BS) apparatus of a wireless communication system, comprising:
a controller for checking whether connection establishment is requested for a service; and
a processor for, if the connection establishment is requested, checking the class of the requested service, converting the transmission request rate of the service into a number of required blocks by using the average block capacity of the checked class, determining a number of available blocks, and determining whether to admit or deny a connection by comparing the number of required blocks with a number of available blocks,
wherein the processor estimates a Modulation and Coding Scheme (MCS) distribution probability for each service class, estimates an average block capacity for each service class by using the MCS distribution probability, determines the number of used blocks for each service class by using the average block capacity, and determines the number of available blocks by using the number of used blocks for the service class, and
wherein the number of available blocks is computed by $$\text{number of available blocks} = \gamma\, S - \sum_{m=1}^{M} S_m^{used},$$

where S denotes a total number of blocks, M denotes the number of service classes, $S_m^{used}$ denotes the number of used blocks for the m-th service class, and $\gamma$ denotes a weighting factor applied to the requested service class.

18. The apparatus of claim 17, wherein different services provided by the wireless communication system are classified into two or more classes according to whether advanced technologies are applied,
wherein the advanced technology is at least one scheme selected from a group of schemes consisting of Adaptive Modulation & Coding (AMC) scheme, permutation, an Automatic Repeat reQuest (ARQ) scheme, a Hybrid ARQ (HARQ) scheme, a Proportional Fairness (PF) scheduling scheme, Multiple Input Multiple Output (MIMO), Beam Forming (BF), and Interference Cancellation (IC).

19. The apparatus of claim 17, wherein, if a connection is admitted or released for a service, the processor updates the number of available blocks.

20. The apparatus of claim 17, wherein the processor checks a class of a requested service upon detecting a connection establishment request of a Mobile Station (MS) to be handed over, converts the transmission request rate of the requested service into the number of required blocks, by using an average block capacity of the checked service class, computes the number of available blocks corresponding to the checked service class, in consideration of a handover condition, and determines whether to admit or deny a connection by comparing the number of required blocks with the number of available blocks in the handover condition.

21. The apparatus of claim 20, wherein when computing the number of available air resource blocks, $(\alpha+\beta)$ is substituted for $\gamma$, where $\alpha$ denotes a weighting factor in a non-handover condition of the corresponding service class, and $(\alpha+\beta)$ denotes a weighting factor in a handover condition.

22. The apparatus of claim 17, wherein a distribution probability $P_i$ for an i-th MCS level for each service class is computed by $$p_i = \frac{n_i}{N_s},$$

where $N_s$ denotes a total number of used blocks in a predetermined time period for a service class and $n_i$ denotes the number of blocks to which the i-th MCS level is applied for the corresponding service class.

23. The apparatus of claim 17, wherein an average block capacity $\Delta r$ of each service class is computed by $$\Delta r = \frac{1}{N_s}\left(\sum_{i=1}^{M} p_i r_i\right),$$

where $N_s$ denotes the total number of used blocks in a predetermined time period for a service class, $p_i$ denotes a distribution for an i-th MCS level for the corresponding service class, M is the total number of MCS levels, $r_i$ denotes the transmission rate of the i-th MCS level for the corresponding service class, $n_i$ denotes the number of blocks to which the i-th MCS level is applied for the corresponding service class, and M denotes the total number of MCS level.

24. The apparatus of claim 17, wherein the number of used blocks for the corresponding service class is computed by $$S^{used} = \sum_{j=1}^{N} \frac{r^j}{\Delta r},$$

where N denotes the number of connections belonging to the corresponding service class, $r^j$ denotes the transmission rate of the j-th connection of the corresponding service class, and $\Delta r$ denotes the average block capacity of the corresponding service class.

25. The apparatus of claim 17, wherein the total number of blocks S is the number of blocks in a data region excluding a control and signaling region.

26. The apparatus of claim 17, wherein the weighting factor $\gamma$ is equally or differently applied to all service classes.

27. The apparatus of claim 17, wherein the number of required blocks is computed by $$\text{number of required blocks} = \frac{r^{in}}{\Delta r},$$

wherein $r^{in}$ denotes the transmission request rate of the requested service and $\Delta r$ denotes the average block capacity of the corresponding service class.

28. The apparatus of claim 17, wherein the processor classifies an Unsolicited Grant Service (UGS), an Extended Real-Time Variable Rate (ERT-VR) service and a Real-Time Variable Rate (RT-VR) service into a first class, and a Non-Real-Time Variable Rate (NRT-VR) service into a second class.

29. The apparatus of claim 17, wherein the processor classifies a UGS into a first class, an ERT-VR service into a second class, an RT-VR service into a third class, and an NRT-VR service into a fourth class.

30. The apparatus of claim 20, wherein different services are classified into two or more classes according to whether advanced technologies are applied, wherein the advanced technology is at least one scheme selected from a group of schemes consisting of Adaptive Modulation & Coding (AMC) scheme, permutation, an Automatic Repeat reQuest (ARQ) scheme, a Hybrid ARQ (HARQ) scheme, a Proportional Fairness (PF) scheduling scheme, Multiple Input Multiple Output (MIMO), Beam Forming (BF), and Interference Cancellation (IC).

31. The apparatus of claim 17, wherein if the number of required air resource blocks is less than the number of available blocks, the connection is admitted.

32. The apparatus of claim 17, wherein the requested service comprises one of an Unsolicited Grant Service (UGS), an Extended Real-Time Variable Rate (ERT-VR) service, a Real-Time Variable Rate (RT-VR) service, a Non-Real-Time Variable Rate (NRT-VR) service, and a Best Effort (BE) service.

33. The apparatus of claim 17, wherein the connection is established by performing a Dynamic Service Addition (DSA) process.

\* \* \* \* \*